United States Patent
Mamiya et al.

(10) Patent No.: US 6,799,228 B2
(45) Date of Patent: Sep. 28, 2004

(54) INPUT/OUTPUT CONTROL APPARATUS, INPUT/OUTPUT CONTROL METHOD AND INFORMATION STORAGE SYSTEM

(75) Inventors: Satomi Mamiya, Kawasaki (JP); Kazuhiko Ikeuchi, Kawasaki (JP); Hidejiro Daikokuya, Kawasaki (JP); Mikio Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 353 days.

(21) Appl. No.: 09/962,072

(22) Filed: Sep. 26, 2001

(65) Prior Publication Data

US 2002/0199038 A1 Dec. 26, 2002

(30) Foreign Application Priority Data

Jun. 22, 2001 (JP) ......................................... 2001-189566

(51) Int. Cl.[7] .............................................. G06F 13/18
(52) U.S. Cl. .............................. 710/40; 710/39; 710/6; 711/151
(58) Field of Search ................................ 710/40, 6, 36, 710/39; 711/151

(56) References Cited

U.S. PATENT DOCUMENTS

| | | | | |
|---|---|---|---|---|
| 5,784,647 A | * | 7/1998 | Sugimoto | 710/39 |
| 5,937,205 A | * | 8/1999 | Mattson et al. | 710/6 |
| 6,633,954 B1 | * | 10/2003 | Don et al. | 711/114 |
| 6,654,837 B1 | * | 11/2003 | Hill et al. | 710/200 |

FOREIGN PATENT DOCUMENTS

| | | |
|---|---|---|
| JP | 2-220152 | 9/1990 |
| JP | 7-239824 | 9/1995 |

* cited by examiner

*Primary Examiner*—Kim Huynh
(74) *Attorney, Agent, or Firm*—Westerman, Hattori, Daniels & Adrian, LLP

(57) ABSTRACT

An input/output control apparatus controls input/output requests from a host unit to a plurality of subordinate unit. A priority order managing section in the input/output control apparatus controls a priority order of the input/output requests based on priority orders of the input/output requests given by the host unit, for each of the subordinate units.

18 Claims, 11 Drawing Sheets

FIG.3

| 111 | | | | | | | |
|---|---|---|---|---|---|---|---|
| REDUNDANT RAID GROUP No. | LOGIC VOLUME No. | START ADDRESS | BLOCK No. | READ/WRITE DATA | CACHE ADDRESS | PRIORITY ORDER | MAIN FRAME/ OPEN HOST ID INFO |
| 112 | 113 | 114 | 115 | 116 | 117 | 118 | 119 |

FIG.10

| SITUATION # | EVENT | STATE OF DA QUEUE | STATE OF DEVICE QUEUE | HIGHEST PRIORITY LEVEL |
|---|---|---|---|---|
| 1 | <EVENT> | | 5 | 5 |
| 2 | 6 ARRIVES | | 5 | 5 |
| 3 | 6 TO DEVICE (TO START OF DEVICE QUEUE) | | 5  6 | 6 |
| 4 | 7a ARRIVES | | 5  6 | 6 |
| 5 | 7a TO DEVICE (TO START OF DEVICE QUEUE) | | 5  6  7a | 7 |
| 6 | 7b ARRIVES | | 5  6  7a | 7 |
| 7 | 7b TO DEVICE (TO END OF DEVICE QUEUE) | | 7b  5  6  7a | 7 |
| 8 | 4 ARRIVES | 4 | 7b  5  6  7a | 7 |
| 9 | 2 ARRIVES (TO END OF DA QUEUE) | 2  4 | 7b  5  6  7a | 7 |
| 10 | 3 ARRIVES (INSERT BETWEEN 4&2) | 2  3  4 | 7b  5  6  7a | 7 |
| 11 | 7a ENDS, 4 TO DEVICE | 2  3 | 4  7b  5  6 | 7 |
| 12 | 6 ENDS, 3 TO DEVICE | 2 | 3  4  7b  5 | 7 |
| 13 | 5 ENDS, 2 TO DEVICE | | 2  3  4  7b | 7 |
| 14 | 7b ENDS | | 2  3  4 | 4 |

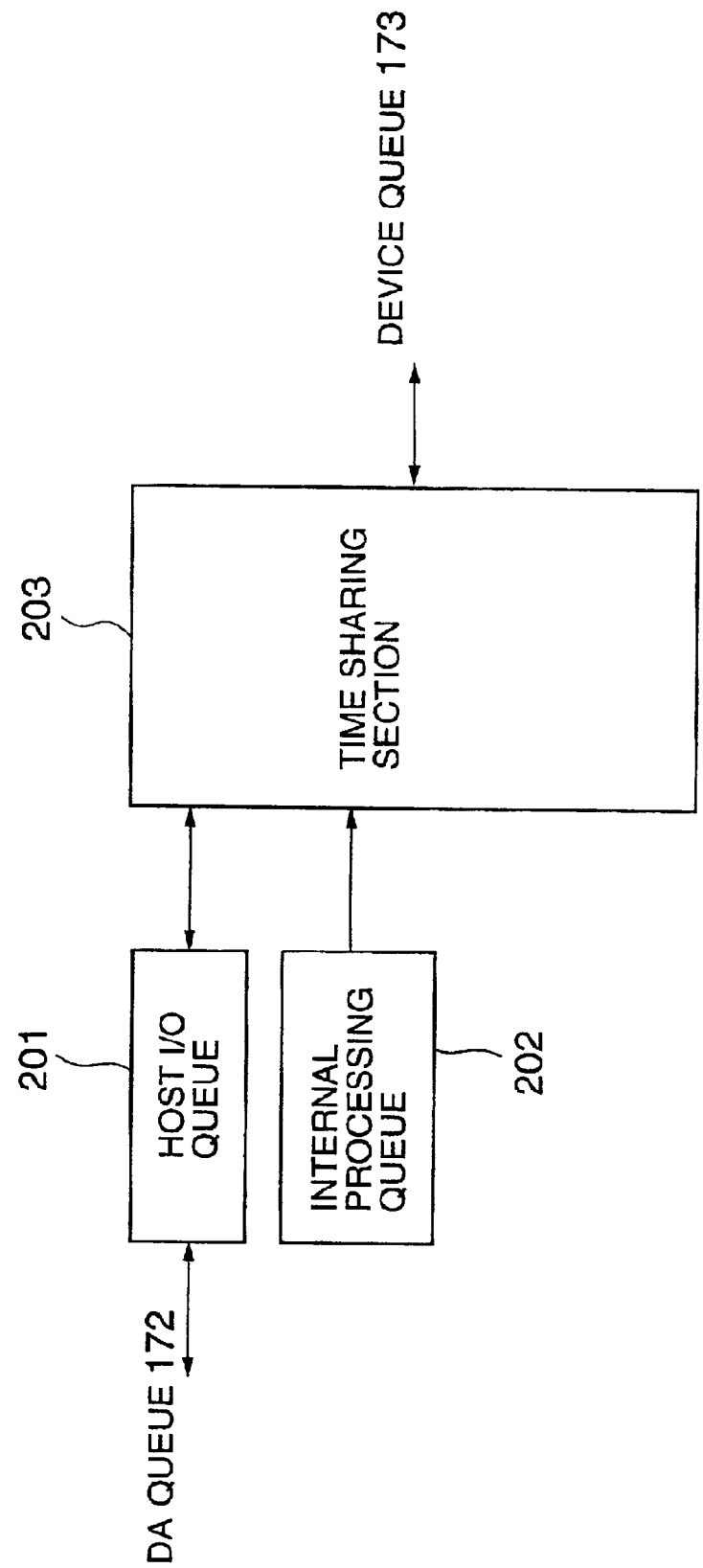

INPUT/OUTPUT CONTROL APPARATUS, INPUT/OUTPUT CONTROL METHOD AND INFORMATION STORAGE SYSTEM

BACKGROUND OF THE INVENTION

This application claims the benefit of a Japanese Patent Application No. 2001-189566 filed Jun. 22, 2001, in the Japanese Patent Office, the disclosure of which is hereby incorporated by reference.

1. Field of the Invention

The present invention generally relates to input or output (hereinafter simply referred to as input/output) control apparatuses, input/output control methods and information storage system, and more particularly to an input/output control apparatus and an input/output control method which control input and output from a host unit to a plurality of slave units, and to an information storage system which employs such an input/output control apparatus or an input/output control method.

There are information storage systems which manage data using a disk unit such as a hard disk drive. In some information storage systems, a RAID structure is used to protect the data from a damage to the disk drive. According to the RAID structure, a plurality of disk drives are provided, and a redundant structure is employed so that the original data can be restored even when a portion of the data is destroyed.

Input and output requests from a main frame system may be directed to different disk drives. In such a case, an input/output control apparatus is provided between the main frame system and the information storage system, so that the input and output can be made efficiently and the plurality of disk drives can be accessed simultaneously.

A request which needs to be executed with priority exists within the input/output requests from the main frame system. For this reason, a mechanism is provided to execute the request which needs to be executed with priority over other input/output requests.

2. Description of the Related Art

In the information storage system, the input/output requests are queued in an input/output queue, and are thereafter distributed to device queues of the requested devices.

FIG. 1 is a diagram for explaining an example of a conventional queue. In FIG. 1, input/output requests from a host unit 1 are queued in a cache queue 2 in a requested order. The requests queued in the cache queue 2 are queued in device queues 3a and 3b of corresponding disk drives 4a and 4b in the requested order, and the requests are executed in the corresponding disk drives 4a and 4b. In this state, in the device queues 3a and 3b, the queuing order of the requests to the device queues 3a and 3b are changed based on the priority order of the corresponding requests. As a result, the requests with the higher priorities are executed with priority over other requests having lower priorities.

However, in the conventional information storage system, the requests from the host unit 1 are distributed to the device queues 3a and 3b via the cache queue 2. Hence, if the disk drive 4a is the request destination of a highest priority request of the cache queue 2 but the device queue 3a of the disk drive 4a has no vacancy, the queuing must wait even if there is vacancy in the device queue 3b of the disk drive 4b which is the request destination of a next request of the cache queue 2. Consequently, there were problems in that the request is delayed, and that a response time cannot be guaranteed.

SUMMARY OF THE INVENTION

Accordingly, it is a general object of the present invention to provide a novel and useful input/output control apparatus, input/output control method and information storage system, in which the problems described above are eliminated.

Another and more specific object of the present invention is to provide an input/output control apparatus, an input/output control method and an information storage system, which can transfer data efficiently with devices.

Still another object of the present invention is to provide an input/output control apparatus for controlling input/output requests from a host unit to a plurality of subordinate units, comprising a priority order managing section which controls a priority order of the input/output requests based on priority orders of the input/output requests given by the host unit, for each of the subordinate units. According to the input/output control apparatus of the present invention, it is possible to reduce the waiting time of the input/output request having a high priority order in the queue, and to guarantee a response time of the input/output request having the high priority order, because the order of the input/output requests in the queue is changed depending on the priority order.

A further object of the present invention is to provide an input/output control method for controlling input/output requests from a host unit to a plurality of subordinate units, comprising the step of (a) controlling a priority order of the input/output requests based on priority orders of the input/output requests given by the host unit, for each of the subordinate units. According to the input/output control method of the present invention, it is possible to reduce the waiting time of the input/output request having a high priority order in the queue, and to guarantee a response time of the input/output request having the high priority order, because the order of the input/output requests in the queue is changed depending on the priority order.

Another object of the present invention is to provide an information storage system for controlling input/output requests from a host unit to a plurality of subordinate units, comprising a priority order managing section which controls a priority order of the input/output requests based on priority orders of the input/output requests given by the host unit, for each of the subordinate units. According to the information storage system of the present invention, it is possible to reduce the waiting time of the input/output request having a high priority order in the queue, and to guarantee a response time of the input/output request having the high priority order, because the order of the input/output requests in the queue is changed depending on the priority order.

Two requests having identical priority order may be queued so that a latter received one of the two requests is queued to a lowest priority position. In this case, it is possible to reduce the wait time of the input/output request having a low priority order, and to prevent a considerable delay in a response time of the input/output request having the low priority order.

The priority order managing section may include a first managing section which manages the priority orders of the input/output requests from the host unit, for each of the subordinate units, and a second managing section which manages input/output with respect to the subordinate units. In this case, it is possible to reduce the wait time of the input/output requests by changing the order of the input/output requests in the queues managed by the first and second managing section depending on the priority order.

Other objects and further features of the present invention will be apparent from the following detailed description when read in conjunction with the accompanying drawings.

BRIEF DESCRIPTION OF THE DRAWINGS

FIG. 3 is a diagram showing a data structure of data supplied from a host computer to the information storage system;

FIG. 10 is a diagram for explaining particular priority processes; and

FIG. 11 is a functional block diagram showing a dynamic disk traffic controller.

DESCRIPTION OF THE PREFERRED EMBODIMENTS

Figure 1:
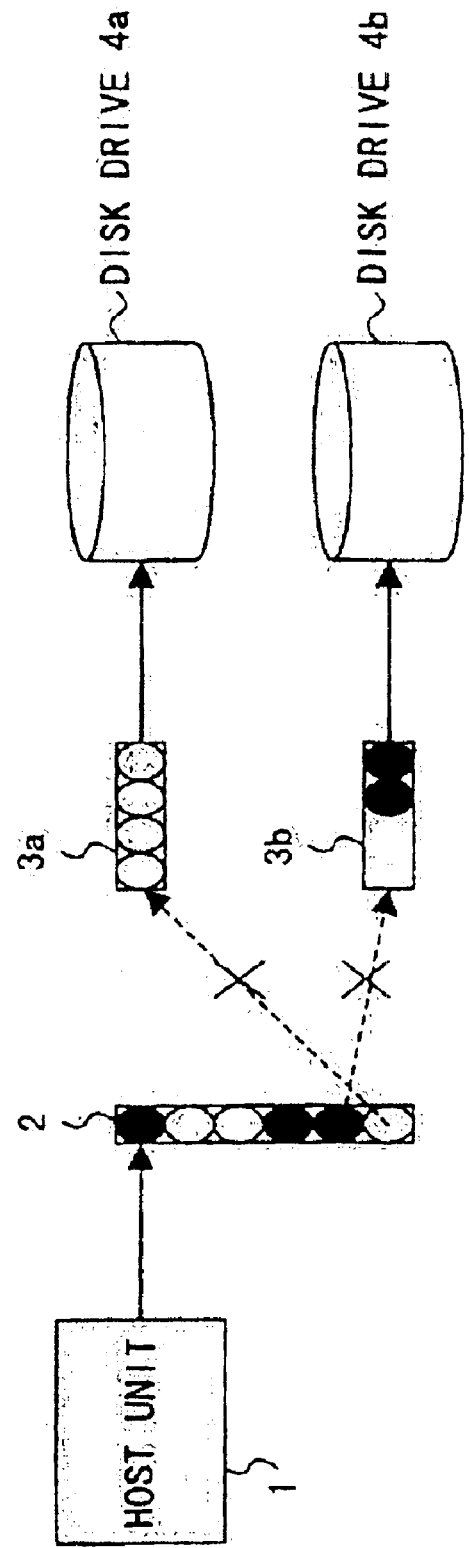
FIG. 1 is a diagram for explaining an example of a conventional queue.
Figure 2:
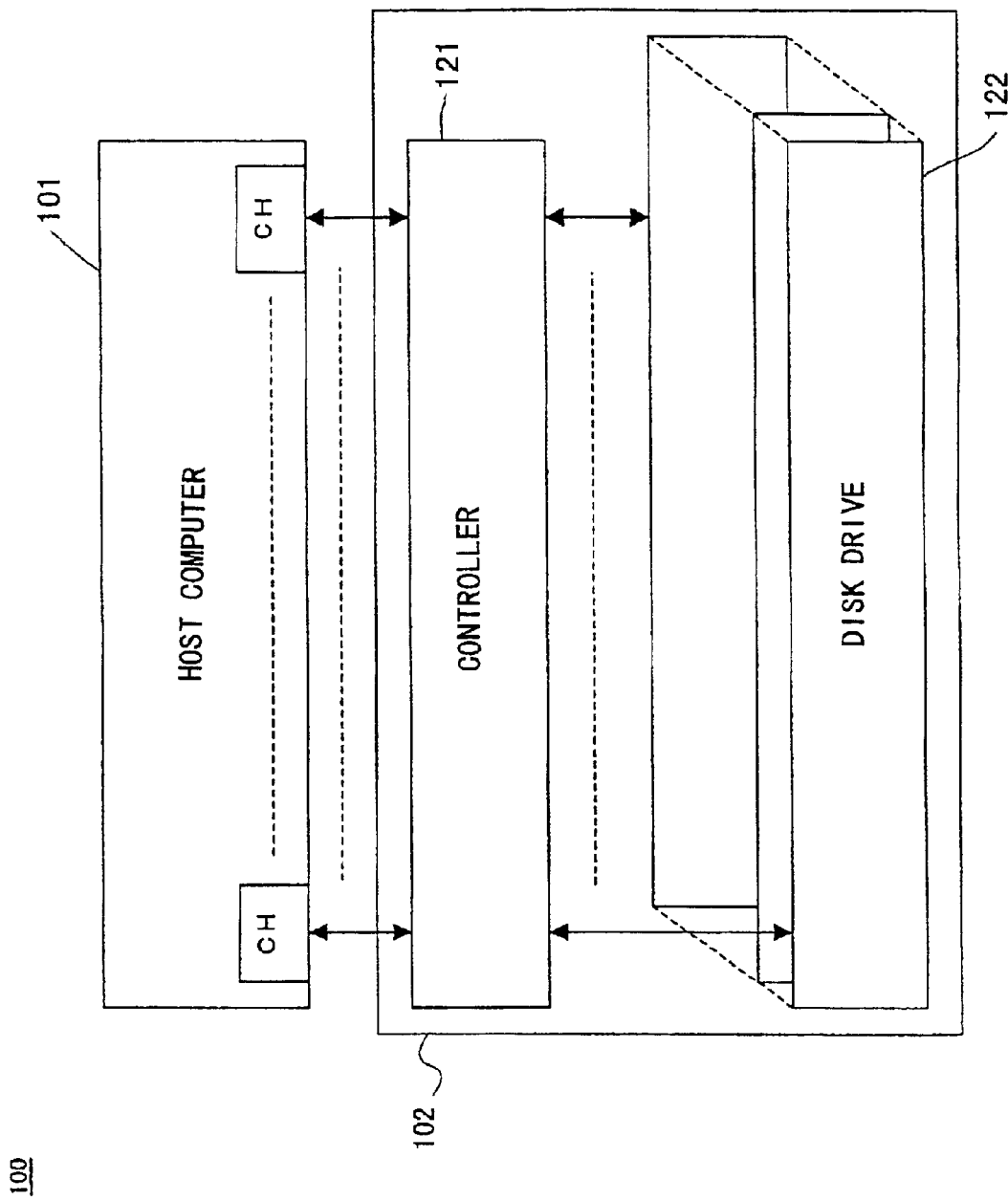
FIG. 2 is a system block diagram showing an embodiment of an information storage system according to the present invention.

FIG. 2 is a system block diagram showing an embodiment of an information storage system according to the present invention. A system 100 shown in FIG. 2 includes a host computer 101 and an information storage system 102. The host computer 100 can communicate with the information storage system 102 via a plurality of channels CH1 through CHn, where n is a positive integer. Data read/write requests are issued from the host computer 101 to the information storage system 102 via the plurality of channels CH1 through CHn.

This embodiment of the information storage system employs an embodiment of an input/output control apparatus according to the present invention and an embodiment of an input/output control method according to the present invention. A controller 121 within the information storage system 102 corresponds to this embodiment of the input/output control apparatus.

FIG. 3 is a diagram showing a data structure of the data supplied from the host computer 101 to the information storage system 102. As shown in FIG. 3, a data 111 transferred between the host computer 101 and the information storage system 102 includes a redundant RAID group number portion 112, a logic volume number portion 113, a start address portion 114, a block number portion 115, a read/write data portion 116, a cache address portion 117, a priority order portion 118, and a main frame system/an open system host identification information portion 119.

A redundant RAID group number of a destination where the data read/write is to be made is set in the redundant RAID group number portion 112. A logic volume number of the destination where the data read/write is to be made is set in the logic volume number portion 113.

A start address of the destination where the data read/write is to be made is set in the start address portion 114. A number of blocks of the read/write data is set in the block number portion 115.

Information indicating whether the requested command is a read request or a write request is set in the read/write data portion 116. A cache address of a cache memory in the information storage system 102 where the read/write data is to be stored is set in the cache address portion 117.

A priority order of the read/write data is set in the priority order portion 118. The priority order is set so that the read/write is made in an order which enables efficient processing by an operating system (OS) of the host computer 101. Identification information for identifying whether an instructing source of the read/write is a main frame system host computer or an open system host computer 101 is set in the main frame system/open system host identification information portion 119.

Returning now to the description of FIG. 2, the information storage system 102 includes the controller 121 and a disk drive section 122. The controller 121 receives the read/write request from the host computer 101 shown in FIG. 2, and carries out processes which include writing data to the disk drive section 122 and reading data from the disk drive section 122. The controller 121 and the disk drive section 122 are connected via a SCSI interface.

For example the disk drive section 122 includes a plurality of hard disk drives. The data is recorded on magnetic recording media of the hard disk drives and the data is reproduced from the magnetic recording media of the hard disk drive, in response to an instruction from the controller 121.

Figure 4:
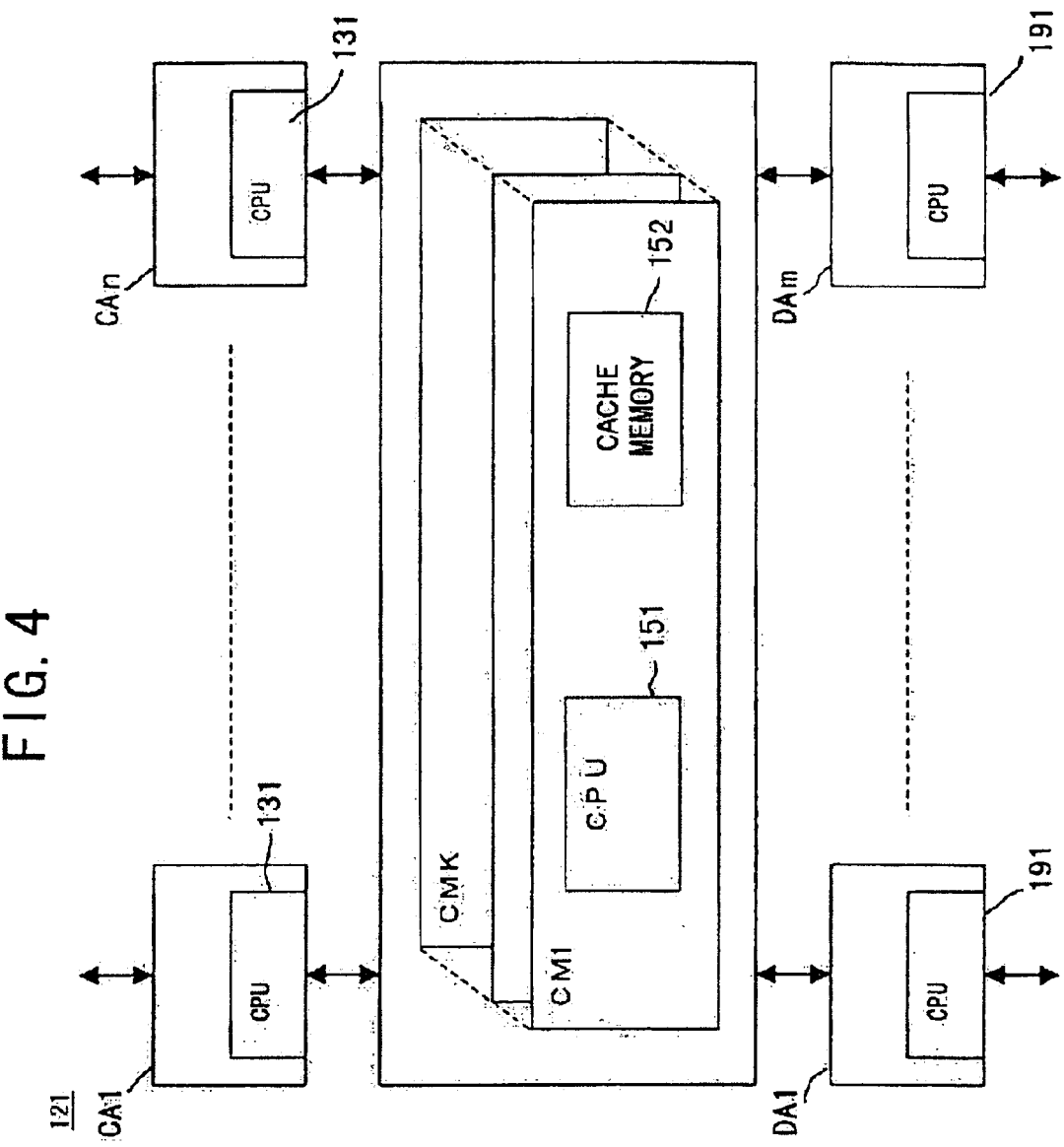
FIG. 4 is a system block diagram showing the structure of a controller.
Figure 5:
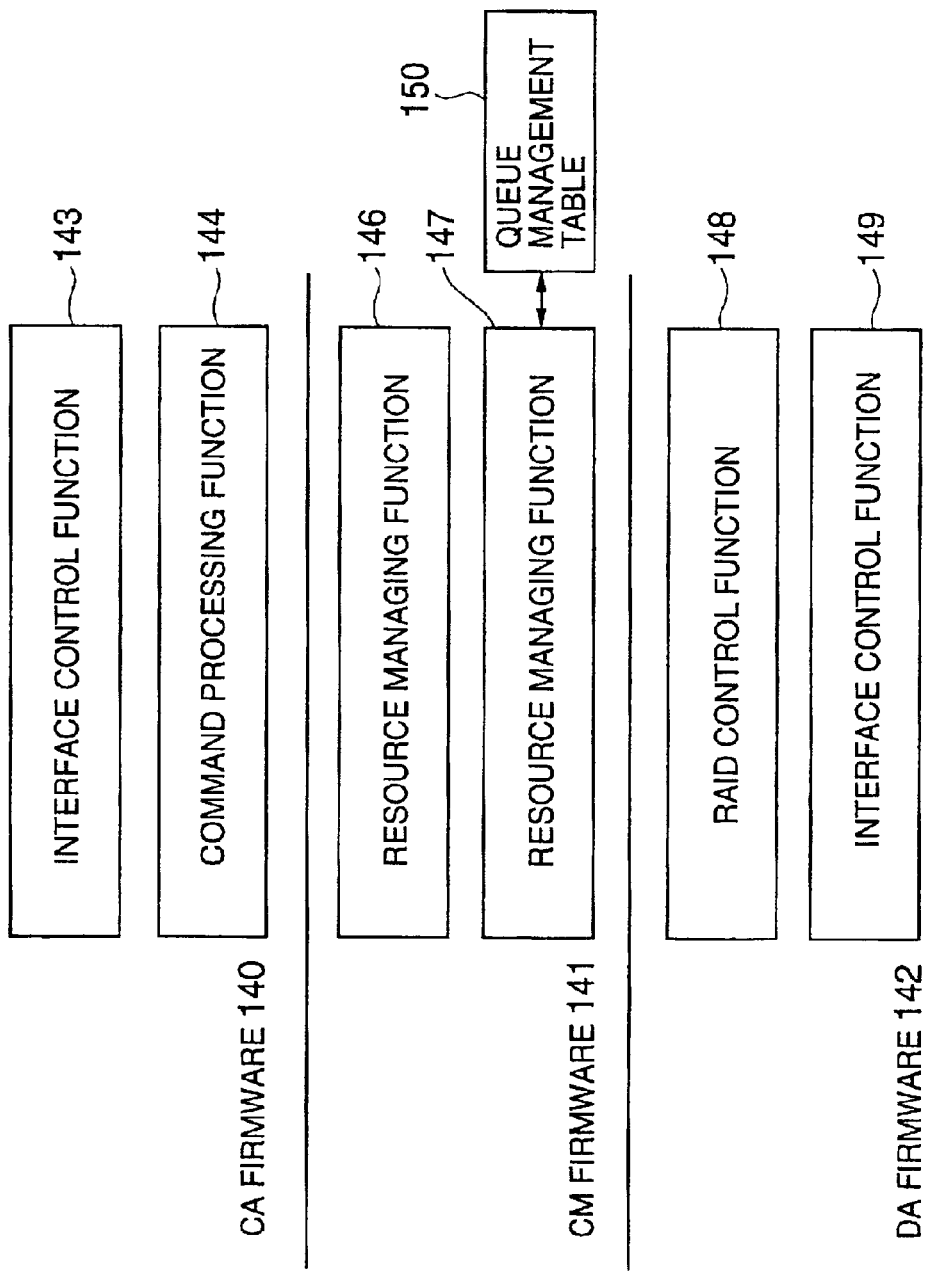
FIG. 5 is a functional block diagram showing the controller.

FIG. 4 is a system block diagram showing the structure of the controller 121. In addition, FIG. 5 is a functional block diagram showing the controller 121.

As shown in FIG. 4, the controller 121 includes channel adapters CA1 through CAn, management modules (centralized modules) CM1 through CMk, and device adapters DA1 through DAm, where n, k and m are positive integers. The channel adapters CA1 through CAn are controlled by a channel adapter firmware 140 shown in FIG. 5. The management modules CM1 through CMk are controlled by a management module firmware 141 shown in FIG. 5. The device adapters DA1 through DAm are controlled by a device adapter firmware 142 shown in FIG. 5.

The channel adapters CA1 through CAn are provided in correspondence with the channels CH1 through CHn of the host computer 101, and each of the channel adapters CA1 through CAn includes a CPU 131. As shown in FIG. 5, the channel adapters CA1 through CAn mainly execute an interface control function 143 and a command processing function 144 by operating the CPUs 131 by the channel adapter firmware 140.

The interface control function 143 mainly carries out an interface control between the information storage system 102 and the host computer 101. In addition, the command processing function 144 mainly analyzes and manages commands.

The management modules CM1 through CMk carry out an interface control between the channel adapters CA1 through CAn and the device adapters DA1 through DAm. Each of the management modules CM1 through CMk includes at least a CPU 151 and a cache memory 152. Each of the management modules CM1 through CMk controls an operation of a subordinate system or unit. The management modules CM1 through CMk execute a resource managing function 146 and a cache memory managing function 147 by operating the CPUs 151 by the management module firmware 141. The resource managing function 146 manages resources.

Since the device adapters DA1 through DAm and the disk drive section 122 are connected via the SCSI interface, the cache memory managing function 147 realizes a priority control of a device queue by use of a Queue TAG function which is a standard function of a SCSI device. The Queue TAG function includes two TAGs, namely, a Simple Queue (with reordering) and a Head of Queue (arranged to a start of queue). The priority control to the device queue is made by use of these two TAGs.

Figure 6:
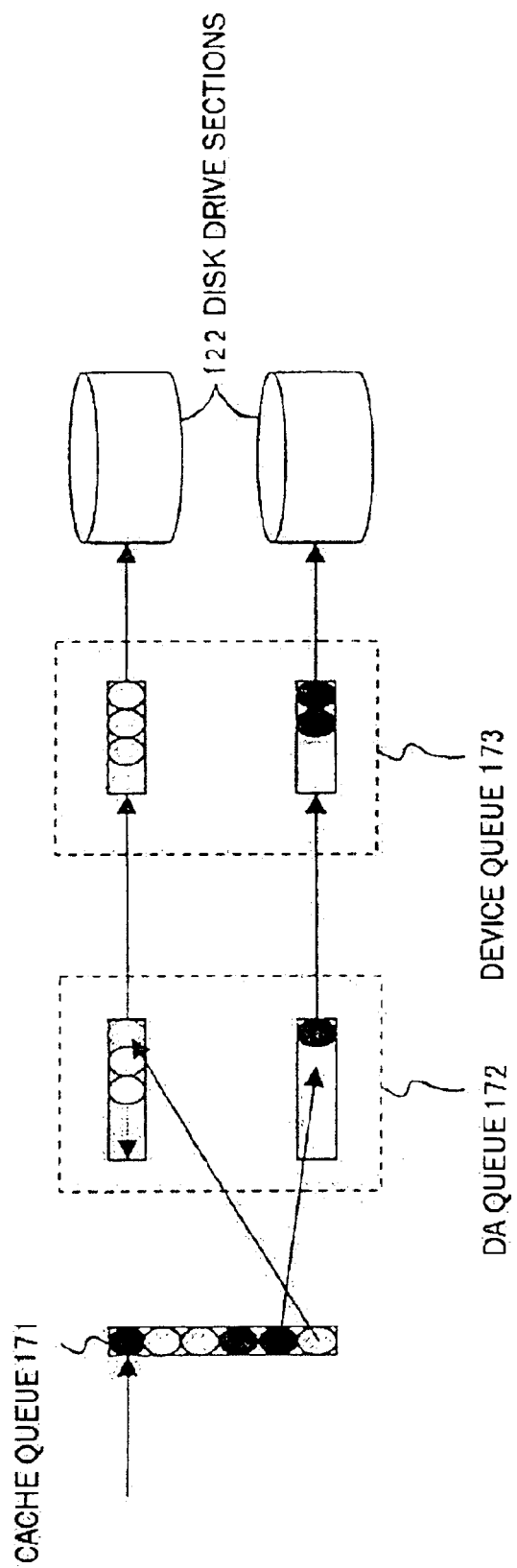
FIG. 6 is a diagram for explaining a state of queues in the controller.

FIG. 6 is a diagram for explaining a state of queues in the controller 121. The controller 121 includes a cache queue 171, a DA queue 172 and a device queue 173 as shown in FIG. 6. The cache queue 171 is formed by the management modules CM1 through CMk, and the requests from the host computer 101 are successively arranged in this cache queue 171. The DA queue 172 forms a first managing section, and is formed by the management modules CM1 through CMk. The requests from the cache queue 171 are arranged for each of the device adapters DA1 through DAm in this DA queue 172.

Queue management of the DA queue 172 and the device queue 173 is made by use of a queue management table 150 shown in FIG. 5.

Figure 7:
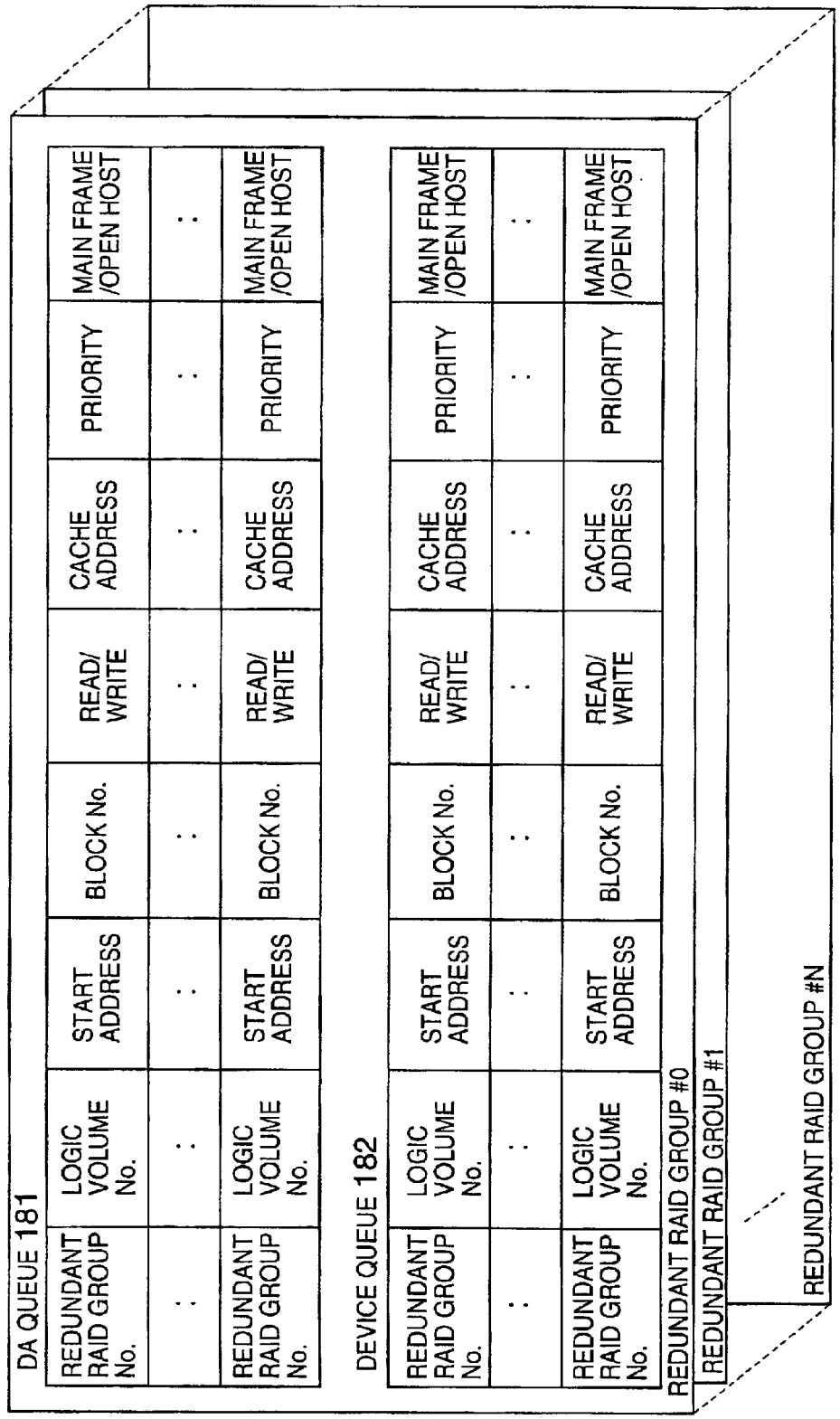
FIG. 7 is a diagram showing a data structure used by a queue management table.

FIG. 7 is a diagram showing a data structure used by the queue management table 150. As shown in FIG. 7, a DA queue table 181 and a device queue table 182 are set for each of redundant RAID groups #1 through #N in the queue management table 150.

The DA queue table 181 stores information related to requests which are queued in the DA queue 172. The information related to the requests which are queued in the DA queue 172 has a data structure similar to that shown in FIG. 2. The device queue table 182 stores information related to requests which are queued in the device queue 173. The information related to the requests queued in the device queue 173 has a data structure similar to that shown in FIG. 2. The device adapters DA1 through DAm carry out processes in the order queued in the device queue table 182.

As will be described later, a priority order of the DA queue 172 and the device queue 173 is changed by the CPU 151 based on a priority order given by the host computer 101.

The device adapters DA1 through DAm are modules which carry out an interface control with respect to the disk drive section 122, and include a 2-port FC-AL interface. Each of the device adapters DA1 through DAm includes a CPU 191.

The device adapters DA1 through DAm mainly execute a RAID control function 148 and an interface control function 149 shown in FIG. 5 by operating the CPU 161 based on the DA firmware 142. The RAID control function 148 cooperate with the CM firmware 141 and carry out a RAID control. The interface control function 149 carries out an interface control with respect to the disk drive section 122.

Next, a description will be given of a process of the CPU 151 for changing the priority order of the DA queue 172 and the device queue 173.

First, a description will be given of the operation when making an input/output request from the host computer 101 to the disk drive section 122. For the sake of convenience, it is assumed that the host computer 101 is the main frame system. In addition, it is assumed that the priority process is carried out only with respect to the request from the main frame system, and is not carried out with respect to a request from an open system.

The CPU 151 refers to the information related to the request such as that shown in FIG. 3 from the main frame system or the open system. More particularly, the CPU 151 refers to a main frame system/open system identification information, and judges whether the request is from the main frame system or the open system. The CPU 151 carries out the priority process which will be described hereunder if the request is from the main frame system. On the other hand, if the request is from the open system, the CPU 151 queues the request to a lowest priority order position of the DA queue 172 and the device queue 173.

Figure 8:
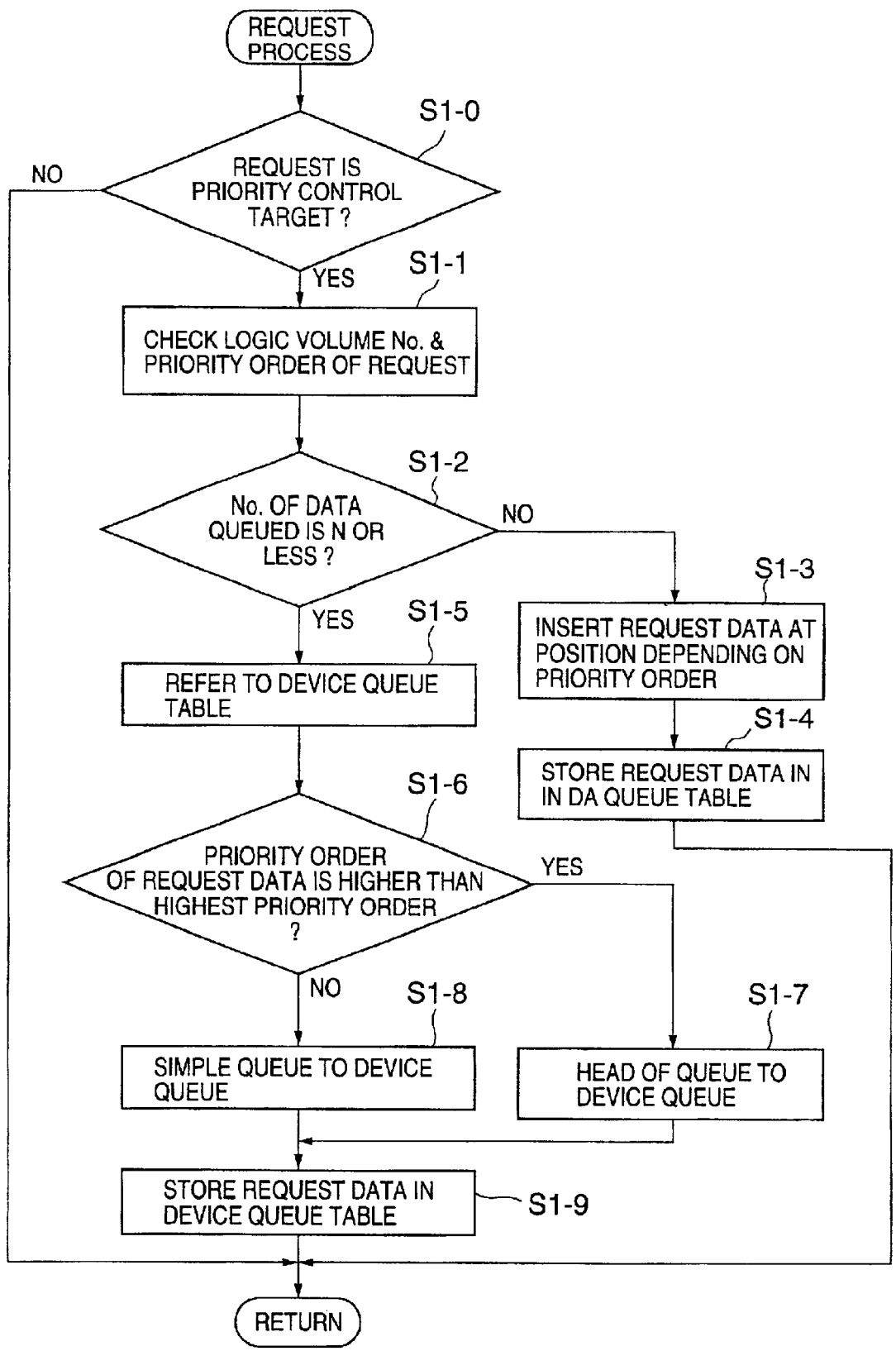
FIG. 8 is a flow chart for explaining a process with respect to a request from the host computer.

FIG. 8 is a flow chart for explaining a process with respect to a request from the host computer 101. The process shown in FIG. 8 is carried out by the CPU 151 when the CPU 151 receives the request from the host computer 101. A step S1-0 decides whether or not the request is to be subjected to a priority process, that is, whether or not the request is a priority control target. If the decision result in the step S1-0 is YES, a step S1-1 checks the logic volume number and the priority order of the request from the host computer 101. On the other hand, the process ends if the decision result in the step S1-0 is NO.

A step S1-2 decides whether or not a number of data queued in the device queue 173 is N or less. The number of data queued in the device queue 173 can be obtained by counting the number of data stored in the device queue table 165 of the queue management table 150.

If the number of data queued in the device queue 173 is greater than N and the decision result in the step S1-2 is NO, a step S1-3 inserts the request data at a priority order position of the DA queue 172 depending on the priority order. The number N corresponds to a maximum number of data that can be queued in the device queue 173. After inserting the request data in the DA queue 172, a step S1-4 stores the request data in the DA queue table 181 which manages the DA queue 172.

On the other hand, if the decision result in the step S1-2 is YES, a step S1-5 refers to the device queue table 182, and a step S1-6 decides whether or not the priority order of the request data is higher than a highest priority order stored in the device queue table 182.

If the decision result in the step S1-6 is YES, a step S1-7 inserts the request data at a highest priority order position of the device queue 173 using the "Head of Queue TAG" function. On the other hand, if the decision result in the step S1-6 is NO, a step S1-8 queues the request data at a lowest priority order position of the device queue 173 using the "Simple Queue TAG" function.

After the request data is queued to the device queue 173 in the step S1-7 or the step S1-6, a step S1-9 stores the request data in the device queue table 182, and the process ends.

Therefore, when the device queue is vacant, the request data is not queued in the DA queue, but is directly queued in the device queue at a position depending on the priority order. For this reason, it is possible to execute the request at a high speed. In addition, when there is no vacancy in the device queue, the request data is queued in the device queue at a position depending on the priority order. Hence, the request having a high priority order is executed at a high speed.

Figure 9:
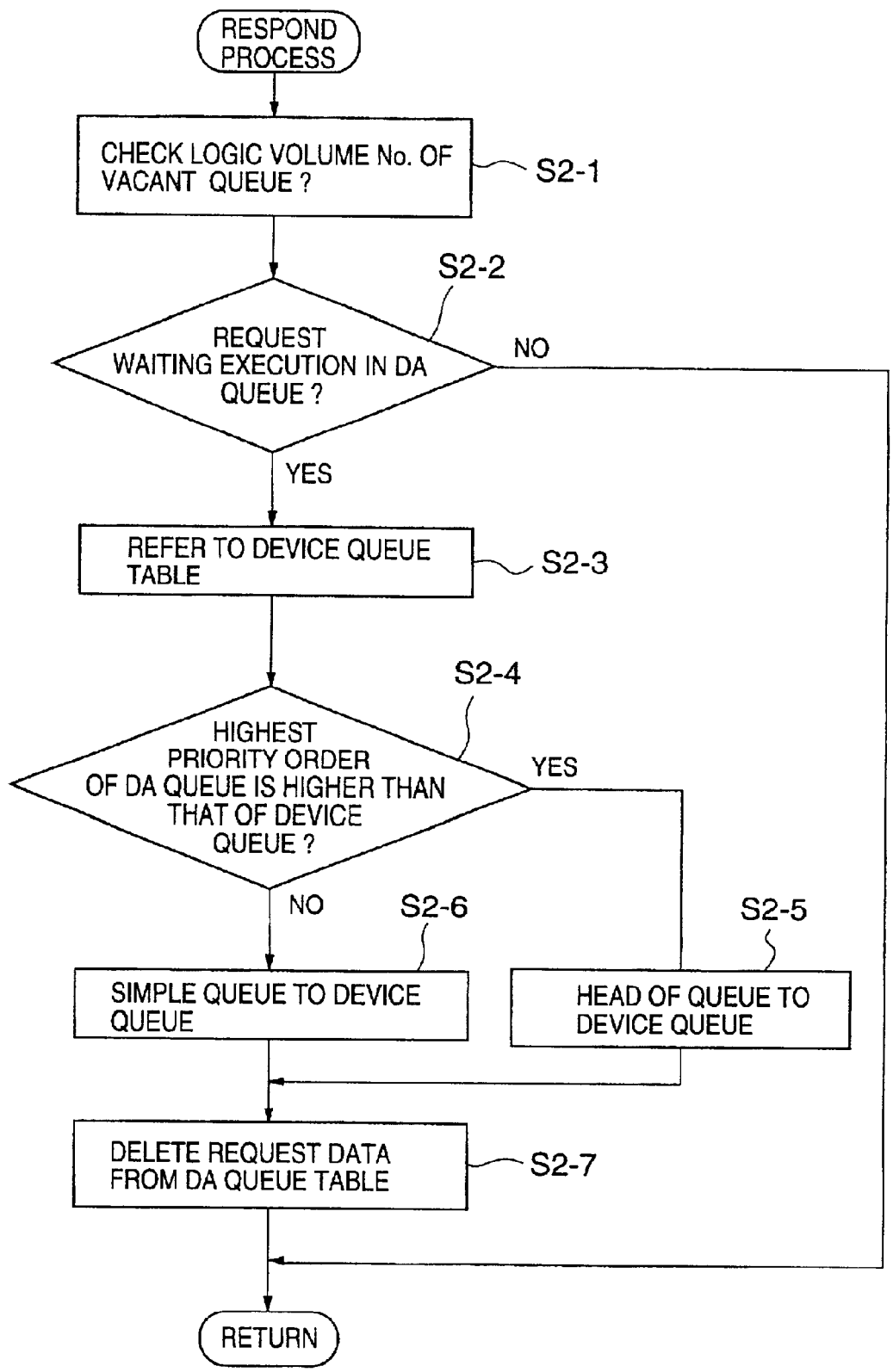
FIG. 9 is a flow chart for explaining a process when responding to the request from the host computer.

FIG. 9 is a flow chart for explaining a process when responding to a request from the host computer 101. The process shown in FIG. 9 is carried out by the CPU 151 when the CPU 151 receives a response from the disk drive section 122 in response to the request from the host computer 101. When the response is received from the disk drive section 122 in response to the request from the host computer 101, a step S2-1 refers to the device queue table 182 and checks the logic volume number of the vacant queue of the device queue 173, to confirm the corresponding device queue 173.

Then, a step S2-2 decides whether or not a request which is waiting to be executed is in the DA queue 172. If the decision result in the step S2-2 is NO, there is no queue which is to respond, and the process ends.

If the decision result in the step S2-2 is YES, a step S2-3 refers to the device queue table 182, and a step S2-4 decides whether or not the highest priority order of the DA queue 172 is higher than the highest priority order of the device queue 173. If the decision result in the step S2-4 is YES, a step S2-5 inserts the request data at the highest priority order position of the device queue 173 by the "Head of Queue TAG" function.

On the other hand, if the decision result in the step S2-4 is NO, a step S2-6 queues the request data to the lowest priority order position of the device queue 173 by the "Simple Queue TAG" function.

After the request data is queued to the device queue 173 in the step S2-5 or the step S2-6, a step S2-7 deletes the request data from the DA queue table 181 and stores the request data in device queue table 182, and the process ends.

The steps S2-1 through S2-7 are repeated when responding to the request from the host computer 101.

Next, a description will be given of particular priority processes, by referring to FIG. 10. FIG. 10 is a diagram for explaining the particular priority processes. In FIG. 10, processing procedures are shown for each of situations #1 through #14 indicated under the "situation" column. In addition, events generated with respect to the CPU 151 are shown under the "event" column. The state of the DA queue 172 is shown under the "DA queue state" column, and the position towards the right has a higher priority. Further, the state of the device queue 173 is shown under the "device queue state" column, and the position towards the right has a higher priority.

The highest priority order of the device queue 173 is shown under the "highest priority level" column. The numbers shown under the "event", "DA queue state", "device queue state" and "highest priority level" columns indicate the priority order, and the larger the number the higher the priority order. Moreover, it is assumed for the sake of convenience that the maximum number of data, N, of the device queue 173 is "4".

The situation #1 corresponds to an initial state. In this initial state, one request having a priority order "5" is set in the device queue 173. Next, in the situation #2, a request having a priority order "6" is generated.

In the situation #3, the request having the priority order "6" is supplied to the disk drive section 122 with the highest priority. The request having the priority order "6" is queued to the device queue 173, because only one event having the priority order "5" is queued in the device queue 173. In this case, since the priority order "6" is higher than the priority order "5", the request having the priority order "6" is queued to a priority order position of the device queue 173 higher than that of the event having the priority order "5". In this particular case, the priority order "6" is the highest priority order existing in the device queue 173.

When a request "a" having a priority order "7" (hereinafter simply referred to as a request 7a) is generated in the situation #4, this request 7a is queued to a highest priority order position of the device queue 173 in the situation #5. Further, when a request "b" having a priority order "7" (hereinafter simply referred to as a request 7b) is generated in the situation #6, this request 7b is queued to a lowest priority order position of the device queue 173 in the situation #7. When the requests 7a and 7b having the same priority order "7" are generated, the request 7b which is generated second is queued to the lowest priority order position of the device queue 173.

When a request having a priority order "4" is generated in the situation #8, four requests, that is, the maximum number of requests that can be queued in the device queue 173, is already queued in the device queue 173 in this state. For this reason, the request having the priority order "4" is queued to the DA queue 172. When a request having a priority order "2" is generated in the situation #9, this request having the priority order "2" is queued to the end, that is, the lowest priority order position, of the DA queue 172, because the priority order "2" is lower than the priority order "4".

When a request having a priority order "3" is generated in the situation #10, this request is queued to the DA queue 172 between the request having the priority order "4" and the request having the priority order "2", because the priority order "3" is higher than the priority order "2" and lower than the priority order "4". When the request 7a having the highest priority order "7" in the device queue 173 ends in the situation #11, the number of requests queued in the device queue 173 becomes three, and thus, the request having the highest priority order "4" in the DA queue 172 is queued to the device queue 173. In this case, the priority order "4" is lower than the highest priority order "7" in the device queue 173, and the request having the priority order "4" is therefore queued at the lowest priority order position of the device queue 173. The highest priority order in the device queue 173 remains to be "7", because the request 7b having the priority order "7" remains in the device queue 173. Consequently, a request having a priority order "6" or lower is queued to the lowest priority order position of the device queue 173.

When the request having the priority order "6" and positioned at the highest priority order position in the device queue 173 ends in the situation #12, the number of requests in the device queue 173 becomes three, and thus, the request having the highest priority order "3" in the DA queue 172 is queued to the device queue 173. In this case, the priority order "3" is lower than the highest priority order "7" in the device queue 173, and the request having the priority order "3" is therefore queued at the lowest priority order position of the device queue 173.

When the request having the priority order "5" and positioned at the highest priority order position in the device queue 173 ends in the situation #13, the number of requests in the device queue 173 becomes three, and thus, the request having the highest priority order "2" in the DA queue 172 is queued to the device queue 173. In this case, the priority order "2" is lower than the highest priority order "7" in the device queue 173, and the request having the priority order "2" is therefore queued at the lowest priority order position of the device queue 173.

When the request 7b having the priority order "7" ends in the situation #14, no request which is to be executed remains in the DA queue 172, and the three requests respectively having the priority orders "4", "3" and "2" remain in the device queue 173. As a result, the highest priority order becomes "4" in this state. For this reason, if a next request has a priority order which is "5" or less, this next request is positioned to the highest priority order position of the device queue 173, and if the next request has a priority order which is "4" or less, this next request is positioned to the lowest priority order position of the device queue 173.

Accordingly, the device queues 173 to be queued in the device queue table 182 can be queued in an order depending on the priority order.

The priority order is determined as described above, and the requests are successively executed depending on the priority order.

An access from another host computer may be handled in the following manner. That is, with respect to a main frame system/open system shared volume, biased priority control is avoided by processing the volume not as a priority control target.

The priority control described above can be made valid or invalid from a setting made on a maintenance screen, by defining the following three parameters.

As a first parameter, a flag FLG1 which invalidates the priority control with respect to the host interface is provided. When this flag FLG1 is ON, a notification indicating that the priority control is supported is returned to the host computer. On the other hand, a notification indicating that the priority control is not supported is returned to the host computer when the flag FLG1 is OFF.

As a second parameter, a flag FLG2 which controls a valid/invalid mode of an internal operation of the priority control function described above is provided. This flag FLG2 sets the internal operation related to the priority control function to the valid mode when ON, and sets the internal operation to the invalid mode when OFF. In the invalid mode, the internal operation becomes the same as that carried out when the priority control function is not supported. However, the valid/invalid mode does not affect the operation of the host interface.

As a third parameter, a flag FLG3 which controls valid/invalid state of an internal processing time monitoring function which is related to the priority control function is provided. This flag FLG3 can be changed in an active state of the priority control function, and is added to the conditions for judging whether or not to make a busy response when a monitoring time elapses. When the flag FLG3 is ON, no busy response is made by the internal processing time monitoring function. However, the internal processing time monitoring and the internal log are made regardless of the ON/OFF state of the flag FLG3.

By setting the first through third parameters described above, it is possible to further improve the operation ease of the priority control function.

Device operations which are carried out responsive to an input/output requests from the host computer 101 basically have priority orders. However, an input/output request having no priority order may be treated as having a lowest priority order.

The priority control target is limited to the processes responsive to the input/output requests from the host computer 101. For this reason, in order to carry out internal processes responsive to requests, other than the priority control target, it is conceivable to apply the time sharing function of a dynamic disk traffic controller (DTC). When the DTC has the queues as shown in FIG. 11 which will be described later, it is possible to process the priority control target (process of the host input/output queue), while preventing the internal process (process of the internal processing queue) from being sacrificed.

FIG. 11 is a functional block diagram showing the DTC. In FIG. 11, a DTC 200 is provided between the DA queue 172 and the device queue 173 shown in FIG. 6. The DTC 200 includes a host input/output queue 201, an internal processing queue 202, and a time sharing section 203. The DTC 200 time-shares the host input/output queue 201 and the internal processing queue 202.

For example, requests generated by a rebuild process, a write-back process, an EC/OPC process and the like are queued in the internal processing queue 202. The requests queued in the internal processing queue 202 are processed asynchronously to the requests queued in the host input/output queue 201. The time sharing section 203 queues the requests queued in the internal processing queue 202 to the device queue 173 with priority over the requests queued in the host input/output queue 201.

A prefetch process must be carried out prior to a host access to a corresponding region. Hence, the priority order of the prefetch process inherits the priority order of a host input/output request which starts a preread function.

According to the priority control of this embodiment, it is possible to guarantee a response time of an on-line request during execution of a batch process, for example. Hence, the priority control function of this embodiment is effective when applied to a case where the on-line process is carried out 24 hours a day and the on-line process and the batch process are carried out in parallel during the day.

Further, the present invention is not limited to these embodiments, but various variations and modifications may be made without departing from the scope of the present invention.

What is claimed is:

1. An input/output control apparatus for controlling input/output requests from a host unit to a plurality of subordinate units, comprising:

a priority order managing section including a first managing section managing a first queue of the input/output requests based on priority orders of the input/output requests given by the host unit for each of the subordinate units, and a second managing section managing a second queue of the input/output requests based on the priority orders of the input/output requests, wherein when the second queue has a vacancy, the input/output requests are queued to the second queue, and when the second queue has no vacancy, the input/output requests are queued in the first queue at a position based on the priority order.

2. The input/output control apparatus as claimed in claim 1, wherein said priority order managing section queues two requests having identical priority order so that a latter received one of the two requests is queued to a lowest priority position.

3. The input/output control apparatus as claimed in claim 1, wherein said priority order managing section changes an order of the input/output requests in the first queue, based on the priority orders of the input/output requests given by the host unit.

4. The input/output control apparatus as claimed in claim 1, wherein said priority order managing section changes an order of the input/output requests in the second queue, based on the priority orders of the input/output requests given by the host unit.

5. The input/output control apparatus as claimed in claim 1, wherein said priority order managing section validates or invalidates management of the priority order based on priority control settings.

6. The input/output control apparatus as claimed in claim 1, wherein said priority order managing section validates or invalidates a time monitoring depending on a setting.

7. An input/output control method for controlling input/output requests from a host unit to a plurality of subordinate units, comprising:

(a) controlling a priority order of the input/output requests, including managing a first queue of the input/output requests based on priority orders of the input/output requests given by the host unit for each of the subordinate units, and managing a second queue of the input/output requests based on the priority orders of the input/output requests, wherein when the second queue has a vacancy, the input/output requests are queued to the second queue, and when the second queue has no vacancy, the input/output requests are queued in the first queue at a position based on the priority order.

8. The input/output control method as claimed in claim 7, wherein said step (a) queues two requests having identical priority order so that a latter received one of the two requests is queued to a lowest priority position.

9. The input/output control method as claimed in claim 7, wherein said step (a) validates or invalidates management of the priority order based on priority control settings.

10. The input/output control method as claimed in claim 7, wherein said step (a) validates or invalidates a time monitoring depending on a setting.

11. The input/output control method as claimed in claim 7, wherein when a highest priority of the input/output requests in the first queue is higher than a highest priority of the input/output requests in the second queue, said first managing section transfers the highest priority of the input/output requests in the first queue to a head position in the second queue.

12. An information storage system for controlling input/output requests from a host unit to a plurality of subordinate units, comprising:

a priority order managing section including a first managing section managing a first queue of the input/output requests based on priority orders of the input/output requests given by the host unit, for each of the subordinate un its, and a second managing section managing a second queue of the input/output requests based on the priority orders of the input/output requests, wherein when the second queue has a vacancy, the input/output requests are queued to the second queue, and when the second queue has no vacancy, the input/output requests are queued in the first queue at a position based on the priority order.

13. The information storage system as claimed in claim 12, wherein said priority order managing section queues two requests having identical priority order so that a latter received one of the two requests is queued to a lowest priority position.

14. The information storage system as claimed in claim 12, wherein said priority order managing section changes an order of the input/output requests in the second queue, based on the priority orders of the input/output requests given by the host unit.

15. The information storage system as claimed in claim 12, wherein said priority order managing section validates or invalidates management of the priority order based on priority control settings.

16. The information storage system as claimed in claim 12, wherein said priority order managing section validates or invalidates a time monitoring depending on a setting.

17. The input/output control apparatus as claimed in claim 1, wherein when a highest priority of the input/output requests in the first queue is higher than a highest priority of the input/output requests in the second queue, said first managing section transfers the highest priority of the input/output requests in the first queue to a head position in the second queue.

18. The information storage system as claimed in claim 12, wherein when a highest priority of the input/output requests in the first queue is higher than a highest priority of the input/output requests in the second queue, said first managing section transfers the highest priority of the input/output requests in the first queue to a head position in the second queue.

* * * * *